(12) United States Patent
Hall

(10) Patent No.: US 7,038,785 B2
(45) Date of Patent: *May 2, 2006

(54) FILTERED CALCULATION OF SENSOR ARRAY INDUCED PHASE ANGLE INDEPENDENT FROM DEMODULATION PHASE OFFSET OF PHASE GENERATED CARRIER

(75) Inventor: David B. Hall, La Crescenta, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 10/615,729

(22) Filed: Jul. 9, 2003

(65) Prior Publication Data

US 2005/0007597 A1    Jan. 13, 2005

(51) Int. Cl.
*G01B 9/02* (2006.01)
(52) U.S. Cl. .................................... 356/478
(58) Field of Classification Search ........ 356/450, 356/477, 478; 250/227.19, 227.27; 367/135, 367/136, 153, 154; 385/12
See application file for complete search history.

(56) References Cited

U.S. PATENT DOCUMENTS 4,552,457 A    11/1985    Giallorenzi et al.
5,452,086 A    9/1995    Bunn
5,903,350 A    5/1999    Bush et al.
6,122,057 A    9/2000    Hall
6,154,308 A *  11/2000    Hall ........................... 359/325
2004/0257580 A1* 12/2004    Hall ........................... 356/478

FOREIGN PATENT DOCUMENTS

EP    0 936 452    8/1999

OTHER PUBLICATIONS

Kersey, et al., "Multiplexed Mach-Zehnder Ladder Array with Ten Sensor Elements", Electronics Letters, Sep. 14, 1989, pp. 1298-1299, vol. 25, No. 19, IEE Stevenage, USA.
Kersey, et al., "Novel Passive Phase Noise Cancelling Technique for Interferometric Fibre Optic Sensors", Electronics Letters, May 10, 1990, vol. 26, No. 10, pp. 640-641, IEE Stevenage, USA.

* cited by examiner

Primary Examiner—Gregory J. Toatley, Jr.
Assistant Examiner—Michael A. Lyons
(74) Attorney, Agent, or Firm—Patti & Brill, LLC

(57) ABSTRACT

A sensor array employs a parameter to induce a time-varying phase angle on an optical signal that comprises a phase generated carrier with a demodulation phase offset. An output signal from the sensor array is filtered to create a filtered signal. The phase angle is calculated independently of the demodulation phase offset through employment of the filtered signal.

32 Claims, 14 Drawing Sheets

| $Q_j, y = 3$ $I_k, z = 1$ | $S_n, x = 7$ | | | | | | | |
|---|---|---|---|---|---|---|---|---|
| | $S_0$ | $S_1$ | $S_2$ | $S_3$ | $S_4$ | $S_5$ | $S_6$ | $S_7$ |
| $Q_0$ | + | | | | - | | | |
| $Q_1$ | | + | | | | - | | |
| $Q_2$ | | | + | | | | - | |
| $Q_3$ | | | | + | | | | - |
| $I_0$ | + | | - | | + | | - | |
| $I_1$ | | + | | - | | + | | - |

FILTERED CALCULATION OF SENSOR ARRAY INDUCED PHASE ANGLE INDEPENDENT FROM DEMODULATION PHASE OFFSET OF PHASE GENERATED CARRIER

STATEMENT OF GOVERNMENT RIGHTS

The Government of the United States of America has rights in this invention pursuant to Contract No. N00024-02-C-6305 awarded by the U.S. Department of the Navy.

CROSS-REFERENCE TO RELATED APPLICATION

This application contains subject matter that is related to the subject matter of the following application, which is assigned to the same assignee as this application. The below-listed application is hereby incorporated herein by reference in its entirety:

"CALCULATION OF SENSOR ARRAY INDUCED PHASE ANGLE INDEPENDENT FROM DEMODULATION PHASE OFFSET OF PHASE GENERATED CARRIER," by David B. Hall, application Ser. No. 10/600,099, filed Jun. 20, 2003.

TECHNICAL FIELD

The invention relates generally to signal processing and more particularly to demodulation of signals from fiber optic sensor arrays.

BACKGROUND

Fiber optic sensor arrays of a time division multiplexed ("TDM") system are often used to measure a change in a parameter, for example, acoustic vibration, fluid pressure variations, acceleration, and magnetic field intensity. The fiber optic sensor array employs a phase generated carrier with a period T to measure the change in the parameter at a given sampling rate. The fiber optic sensor array converts a phase angle associated with the parameter to an amplitude variation on an output pulse of light.

The phase angle is measured through various demodulation techniques of the output pulse. Typical demodulation techniques employ a quadrature component Q and an in-phase component I of the output pulse. The quadrature component Q corresponds to a sine of the phase angle, and the in-phase component I corresponds to a cosine of the phase angle. An arctangent of the ratio Q/I is equal to the phase angle. The magnitude of the change in the parameter can then be calculated from the change in the phase angle.

Calculation of the quadrature component Q and the in-phase component I requires multiple samples of the output pulse at specific intervals of the phase generated carrier. The output pulse is filtered to improve characteristics of the output pulse. A period of the phase generated carrier is significantly longer than a period of the output pulse. The longer period of the phase generated carrier requires the samples to span several output pulses to obtain each required interval of the phase generated carrier. The longer period of the phase generated carrier reduces the sampling rate of the demodulation technique.

High-speed phase generated carriers (e.g., a frequency greater than 1 MHz, or a period less than 1000 nanoseconds) do not permit the precise control of a demodulation phase offset $\beta$ associated with the phase generated carrier. One shortcoming of the demodulation techniques is that a variation in the demodulation phase offset $\beta$ from a fixed value reduces the accuracy of the demodulation techniques.

Thus, a need exists for reduced dependency on demodulation phase offsets for demodulation techniques of fiber optic sensor arrays that employ phase generated carriers and filters.

SUMMARY

The invention in one embodiment encompasses a method. A sensor array employs a parameter to induce a time-varying phase angle $\phi$ on an optical signal that comprises a phase generated carrier with a demodulation phase offset $\beta$. An output signal from the sensor array is filtered to create a filtered signal. The phase angle $\phi$ is calculated independently of the demodulation phase offset $\beta$ through employment of the filtered signal.

Another embodiment of the invention encompasses an apparatus. A sensor array employs a parameter to induce a time-varying phase angle $\phi$ on an optical signal that comprises a phase generated carrier with a demodulation phase offset $\beta$. The apparatus comprises a filter component that filters an output signal from the sensor array to create a filtered signal. The apparatus further comprises a processor component that employs the filtered signal to calculate the phase angle $\phi$ independent from the demodulation phase offset $\beta$.

A further embodiment of the invention encompasses an article. A sensor array employs a parameter to induce a time-varying phase angle $\phi$ on an optical signal that comprises a phase generated carrier with a demodulation phase offset $\beta$. The article includes one or more computer-readable signal-bearing media. The article includes means in the one or more media for filtering an output signal from the sensor array to create a filtered signal. The article includes means in the one or more media for calculating the phase angle $\phi$ independently of the demodulation phase offset $\beta$ through employment of the filtered signal.

DESCRIPTION OF THE DRAWINGS

Features of exemplary implementations of the invention will become apparent from the description, the claims, and the accompanying drawings in which:

FIG. 3 is a representation of one exemplary set of calculations for the exemplary implementation of FIG. 1.

Figure 4:
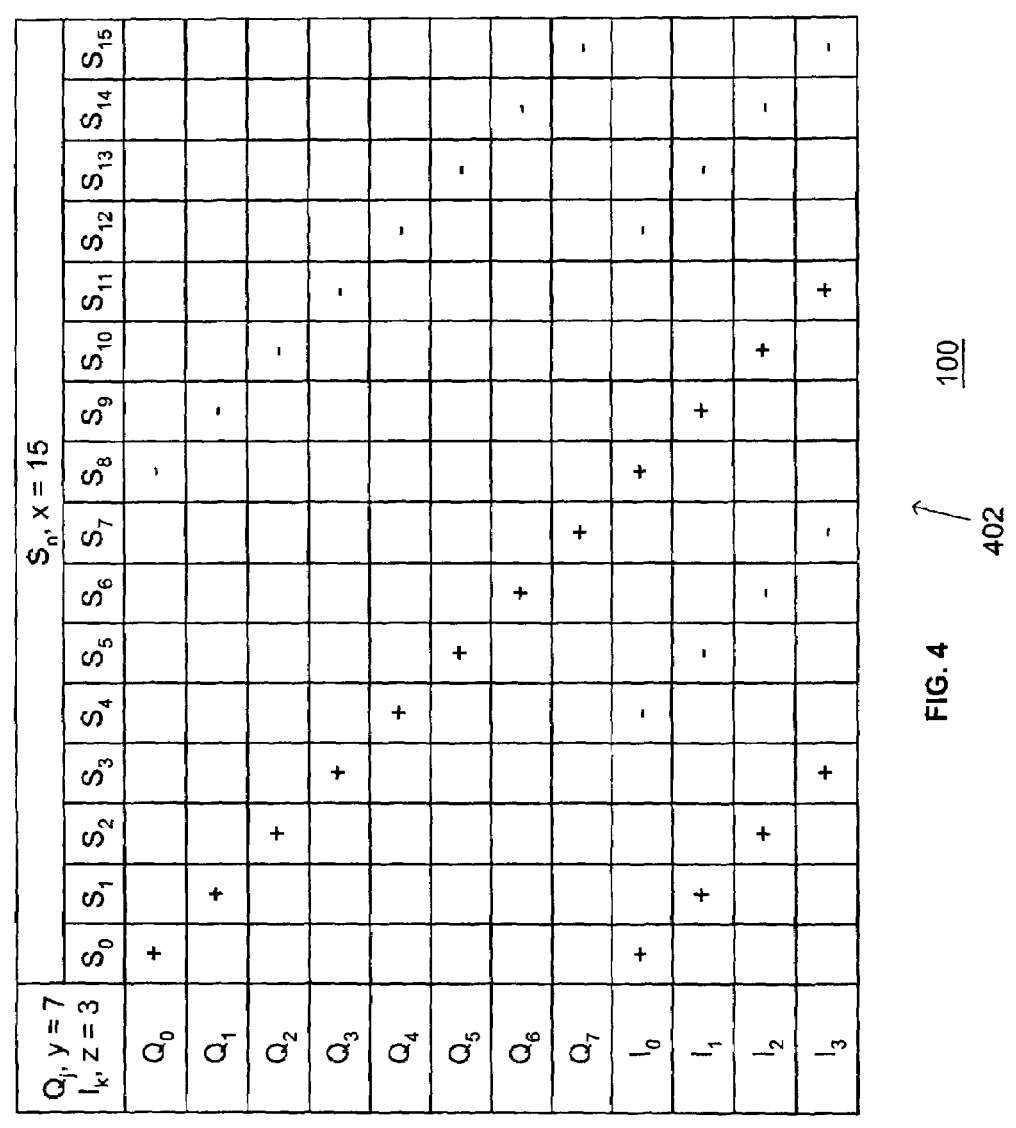

FIG. 4 is a representation of another exemplary set of calculations for the exemplary implementation of FIG. 1.

DETAILED DESCRIPTION

Figure 1:
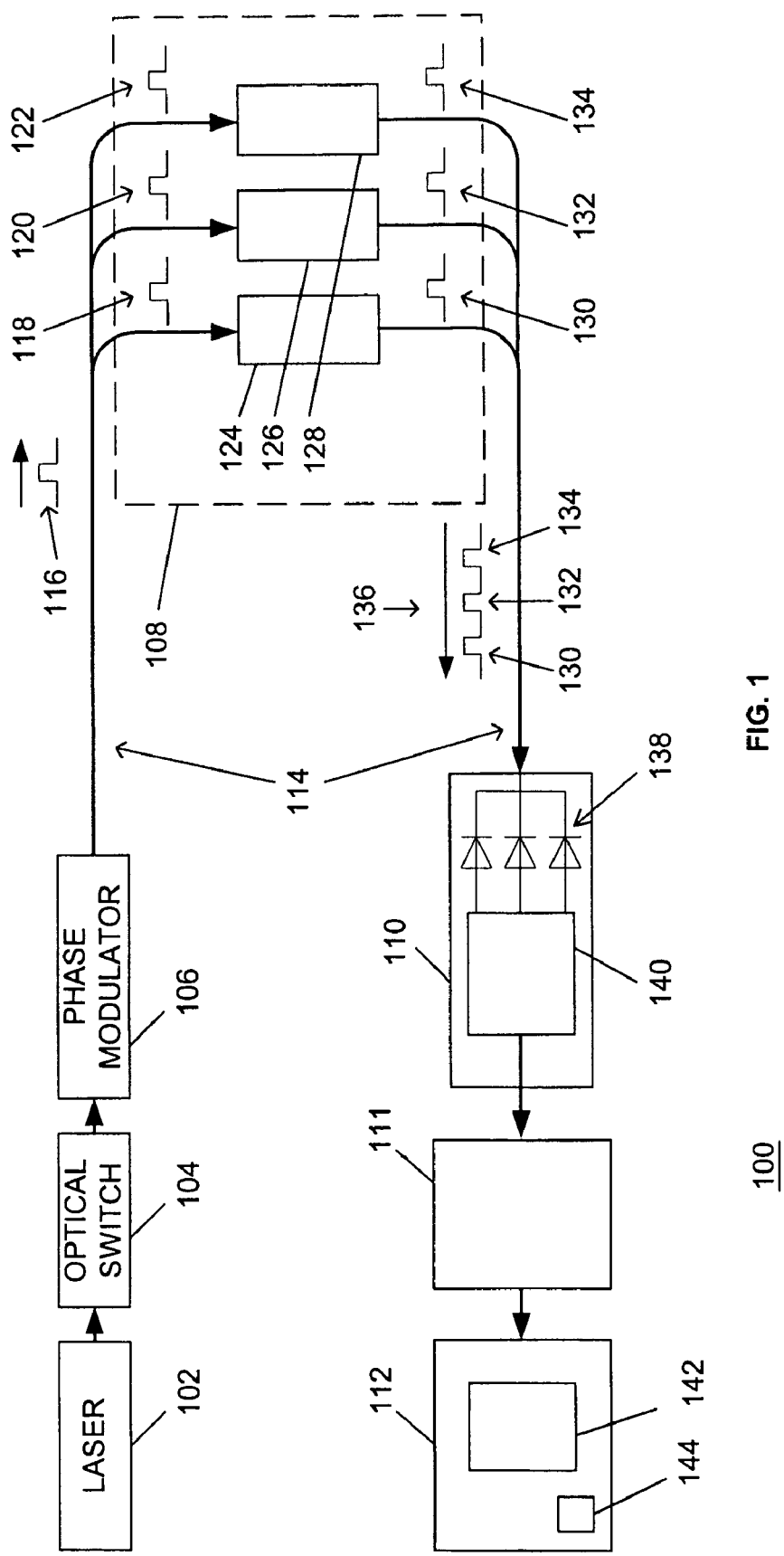
FIG. 1 is a representation of one exemplary implementation of an apparatus that comprises one or more lasers, one or more optical switches, one or more phase modulators, one or more sensor arrays, one or more optical receivers, one or more filter components, and one or more processor components for calculating a phase angle of an optical signal independently of a demodulation phase offset.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

Referring to FIG. 1, the apparatus 100 in one example comprises one or more lasers 102, one or more optical switches 104, one or more phase modulators 106, one or more sensor arrays 108, one or more optical receivers 110, one or more filter components 111, and one or more processor components 112. In one example, the apparatus 100 demodulates an optical signal to measure a change in a parameter, as described herein. The laser 102 in one example comprises a continuous wave laser. The laser 102 generates and sends an optical signal through the optical switch 104 and the phase modulator 106 to the sensor array 108.

The optical switch 104 in one example comprises a time division multiplexed ("TDM") switch. The optical switch 104 gates the optical signal such that the optical signal comprises a stream of optical pulses. The phase modulator 106 impresses a phase generated carrier ("PGC") 114 on the stream of optical pulses. For example, the laser 102, the optical switch 104, and the phase modulator 106 cooperate to create one or more optical pulses 116 that comprise the phase generated carrier 114, as will be understood by those skilled in the art. The optical pulse 116 comprises a period $T_{pulse}$. The period $T_{pulse}$ in one example is approximately between 100 nanoseconds and 1000 nanoseconds. The phase generated carrier 114 in one example comprises a period $T_{pgc}$ and a modulation depth of M. The period $T_{pgc}$ comprises a relationship with a frequency $f_{pgc}=1/T_{pgc}$, as will be understood by those skilled in the art. The frequency $f_{pgc}$ in one example is approximately between 2 MHz and 20 MHz. The phase generated carrier 114 is associated with a demodulation phase offset $\beta$. The phase generated carrier 114 creates a time-varying phase angle equal to $$M \cdot \sin\left(\frac{2\pi \cdot t}{T_{pgc}} + \beta\right).$$

The sensor array 108 in one example comprises one or more sensors 124, 126, and 128, for example, mismatched path interferometers. The sensor array 108 splits the optical pulse 116 into one or more optical pulses 118, 120, and 122, for example, one pulse per sensor. The optical pulses 116, 118, 120, and 122 in one example are substantially the same. The sensors 124, 126, and 128 of the sensor array 108 receive the optical pulses 118, 120, and 122, respectively. The sensors 124, 126, and 128 of the sensor array 108 in one example employ one or more parameters and the optical pulses 118, 120, and 122 to create one or more respective interference pulses 130, 132, and 134. Exemplary parameters comprise acoustic vibration, fluid pressure variations, acceleration, and magnetic field intensity. For example, the sensor 124 splits the optical pulse 118 into a first portion and a second portion. The sensor 124 employs the parameter to induce a time-varying phase angle $\phi$ on the first portion of the optical pulse 118, relative to the second portion of the optical pulse 118. The sensor 124 recombines the first portion of the optical pulse 118 with the second portion of the optical pulse 124 to create the interference pulse 130. A time-varying amplitude variation of the interference pulse 130 represents the time-varying phase angle $\phi$ between the first portion and the second portion of the optical pulse 118.

The optical pulses 116 comprise an intermediary spacing such that the interference pulses 130, 132, and 134 comprise a relatively small spacing, for example, a high duty cycle, as described herein. The interference pulses 130, 132, and 134 comprise a period substantially equal to the period $T_{pulse}$ of the optical pulse 116. The sensor array 108 sends the interference pulses 130, 132, and 134 to the optical receiver 110 in a pulse train 136, for example, in a serial fashion. For example, the optical pulse train 136 comprises the interference pulses 130, 132, and 134.

The optical receiver 110 in one example comprises one or more photodiodes 138. In a further example, the optical receiver 110 comprises a transimpedance amplifier 140. The optical receiver 110 in one example comprises a polarization diversity receiver system (not shown), as defined in U.S. Pat. No. 5,852,507, assigned to the assignee of the present invention. The optical receiver 110 receives the optical pulse train 136. The optical receiver 110 then creates one or more respective analog electrical signals that represent the interference pulses 130, 132, and 134 from the optical pulse train 136. For example, the optical receiver 110 converts a magnitude of power of the optical pulse train 136 to a voltage signal.

The filter component 111 in one example comprises a fourth order Bessel low-pass filter. In another example, the filter component 111 comprises a fourth order real pole filter. For example, the filter component 111 comprises a three decibel roll-off frequency between 10 MHz and 60 MHz. The three decibel roll-off frequency of the filter component 111 in one example is equal to 53 MHz. The filter component serves to filter the optical signal to create a filtered signal. The filter component 111 in one example filters the analog electrical signals from the optical receiver 110 to create one or more filtered signals. For example, the filtered signals represent the interference signals 130, 132, and 134.

The processor component 112 in one example comprises a digital signal processor. In a further example, the processor component 112 comprises an analog-to-digital converter component 142. The processor component 112 in one example comprises an instance of a computer-readable signal-bearing media 144, as described herein. The analog-to-digital converter component 142 converts the filtered signal from the optical receiver 110 into a digital signal. The processor component 112 in one example serves to sense a change in the parameters by employing the time-varying amplitude variation of the interference pulses 130, 132, and 134 to calculate the time-varying phase angle φ.

An illustrative description of exemplary operation of the apparatus 100 is presented, for explanatory purposes. The laser 102, the optical switch 104, and the phase modulator 106 cooperate to create the one or more optical pulses 116. The sensor array 108 splits the optical pulse 116 into the optical pulses 118, 120, and 122. The sensors 124, 126, and 128 employ the parameters and the optical pulses 118, 120, and 122 to create the interference pulses 130, 132, and 134. The sensor array 108 sends the interference pulses 130, 132, and 134 as the optical pulse train 136 to the optical receiver 110.

The optical receiver 110 creates an analog electrical signal that represent the one or more interference pulses 130, 132, and 134. For example, the analog electrical signal is defined as s(t, M, β, φ):

$$s(t, M, \beta, \varphi) = A + B \cdot \cos\left(M \cdot \sin\left(\frac{2\pi \cdot t}{T_{pgc}} + \beta\right) + \varphi\right),$$

where A is an average signal level, B is an interference term signal level, M is the modulation depth, $T_{pgc}$ is the period of the phase generated carrier, β is the demodulation phase offset, and φ is the phase angle. The phase angle of s(t, M, β, φ) comprises a first portion due to the phase generated carrier, $$M \cdot \sin\left(\frac{2\pi \cdot t}{T_{pgc}} + \beta\right),$$

and a second portion due to the parameter, φ, as will be understood by those skilled in the art.

The filter component 111 filters the analog electrical signal to create a filtered signal. The analog-to-digital converter component 142 in one example converts the filtered signal into a digital signal that represents the interference pulse 130. The processor component 112 obtains a plurality of samples $S_n$, n=0 to x, of the interference pulse 130 from the digital signal. The processor component 112 obtains the plurality of samples $S_n$ at time intervals Δt over a period $T_s$. The period $T_s$ in one example is substantially equal to the period $T_{pgc}$ of the phase generated carrier 114. The period $T_s$ in one example serves to promote an increase in sampling rate, as will be appreciated by those skilled in the art. The period $T_s$ in one example is less than or equal to $T_{pulse}$.

The time interval Δt in one example is equal to an even fraction of the period $T_{pgc}$, (e.g. $T_{pgc}/8$ or $T_{pgc}/16$). In one example, the processor component 112 obtains the plurality of samples $S_n$ starting at a time $t_0$, with a time interval Δt of $T_{pgc}/8$. For example, the plurality of samples $S_n$ comprise eight samples at $t_0$, $t_0+\Delta t$, $t_0+2\Delta t$, $t_0+3\Delta t$, $t_0+4\Delta t$, $t_0+5\Delta t$, $t_0+6\Delta t$, and $t_0+7\Delta t$. In another example, the processor component 112 obtains the plurality of samples $S_n$ starting at a time $t_0$ with a time interval Δt of $T_{pgc}/16$. For example, the plurality of samples $S_n$ comprise sixteen samples at $t_0$, $t_0+\Delta t$, $t_0+2\Delta t$, $t_0+3\Delta t$, $t_0+4\Delta t$, $t_0+5\Delta t$, $t_0+6\Delta t$, $t_0+7\Delta t$, $t_0+8\Delta t$, $t_0+9\Delta t$, $t_0+10\Delta t$, $t_0+11\Delta t$, $t_0+12\Delta t$, $t_0+13\Delta t$, $t_0+14\Delta t$, and $t_0+15\Delta t$.

The processor component 112 employs one or more of the plurality of samples $S_n$ to calculate one or more quadrature terms and one or more in-phase terms. The processor component 112 in one example calculates a set of quadrature terms $Q_j$, j=0 to y. For example, the set of quadrature terms $Q_j$ comprises a number of quadrature terms equal to ½ a number of samples of the plurality of samples $S_n$. In one example where the plurality of samples $S_n$ comprises eight samples, y is equal to three, and the processor component 112 calculates the set of quadrature terms $Q_j$ as:

$Q_0=S_0-S_4$, $Q_1=S_1-S_5$, $Q_2=S_2-S_6$, and $Q_3=S_3-S_7$     (FIG. 3).

In another example where the plurality of samples $S_n$ comprises sixteen samples, y is equal to seven, and the processor component 112 calculates the set of quadrature terms $Q_j$ as:

$Q_0=S_0-S_8$, $Q_1=S_1-S_9$, $Q_2=S_2-S_{10}$, $Q_3=S_3-S_{11}$, $Q_4=S_4-S_{12}$, $Q_5=S_5-S_{13}$, $Q_6=S_6-S_{14}$, and $Q_7=S_7-S_{15}$     (FIG. 4).

The processor component 112 in one example calculates a set of in-phase terms $I_k$, k=0 to z. For example, the set of in-phase terms $I_k$ comprises a number of in-phase terms equal to ¼ the number of samples of the plurality of samples $S_n$. In one example where the plurality of samples $S_n$ comprises eight samples, z is equal to one, and the processor component 112 calculates the set of in-phase terms $I_k$ as:

$I_0=(S_0+S_4)-(S_2+S_6)$, and $I_1=(S_1+S_5)-(S_3+S_7)$     (FIG. 3).

In another example where the plurality of samples $S_n$ comprises sixteen samples, z is equal to three, and the processor component 112 calculates the set of in-phase terms $I_k$ as:

$I_0=(S_0+S_8)-(S_4+S_{12})$, $I_1=(S_1+S_9)-(S_5+S_{13})$, $I_2=(S_2+S_{10})-(S_6+S_{14})$, and $I_3=(S_3+S_{11})-(S_7+S_{15})$     (FIG. 4).

The processor component 112 employs the set of quadrature terms $Q_j$ to calculate a quadrature term $Q_s$. The processor component 112 in one example calculates the quadrature term $Q_s$ as:

$$Q_s = \sqrt{\sum_{j=0}^{j=y} Q_j^2}.$$

The quadrature term $Q_s$ is independent of the demodulation phase offset β, as will be appreciated by those skilled in the art.

The processor component 112 employs the set of in-phase terms $I_k$ to calculate an in-phase term $I_s$. The processor component 112 calculates a constant $C_1$ as described herein. The processor component 112 in one example calculates the in-phase term $I_s$ as:

$$I_s = C_1 \times \sqrt{\sum_{k=0}^{k=z} I_k^2}.$$

The in-phase term $I_s$ is independent of the demodulation phase offset $\beta$, as will be appreciated by those skilled in the art. The processor component 112 in one example calculates the constant $C_1$ such that respective maximum absolute values of the quadrature term $Q_s$ and the in-phase term $I_s$ are substantially equal at a modulation depth M of an operating range.

The modulation depth M in one example is between 1.0 and 1.7 radians. For example, the modulation depth M is sufficiently large to promote an increase in signal strength of the phase generated carrier 114. The modulation depth M in a further example is sufficiently small to promote stability of the quadrature term $Q_s$ and the in-phase term $I_s$ with respect to a change in the modulation depth M. For example, the modulation depth M is approximately equal to $\pi/2$.

The processor component 112 employs one or more of the set of quadrature terms $Q_j$ and the quadrature term $Q_s$ to calculate a quadrature term Q. The processor component 112 in one example employs a magnitude of the quadrature term $Q_s$ and a sign of one of the quadrature terms of the set of quadrature terms $Q_j$ to calculate Q. For example, the processor component 112 chooses the quadrature term $Q_1$ that comprises a relatively large magnitude to avoid a zero crossing of the magnitude. The processor component 112 chooses a different quadrature term with a larger magnitude, for example, the quadrature term $Q_0$, when the magnitude of the quadrature term $Q_1$, approaches zero. The quadrature term Q is independent from the demodulation phase offset $\beta$, as will be appreciated by those skilled in the art.

The processor component 112 employs one or more of the set of in-phase terms $I_k$ and the in-phase term $I_s$ to calculate an in-phase term I. The processor component 112 in one example employs a magnitude of the in-phase term $I_s$ and a sign of one of the in-phase terms of the set of in-phase terms $I_s$ to calculate I. For example, the processor component 112 chooses an in-phase term $I_1$ that comprises a relatively large magnitude to avoid a zero crossing of the magnitude. The processor component 112 chooses a different in-phase term, for example, the in-phase term $I_0$, when the magnitude of the in-phase term $I_1$ approaches zero. The in-phase term I is independent from the demodulation phase offset $\beta$, as will be appreciated by those skilled in the art.

A change in the demodulation phase offset $\beta$ in one example changes the sign of the quadrature term Q and/or the in-phase term I. Four bands of operation of width $\pi/2$ in one example exist across a total range of 0 to $2\pi$ for the demodulation phase offset $\beta$. Where the magnitude of the demodulation phase offset $\beta$ is near a border of a band of operation, the magnitude of the in-phase term $I_k$ chosen to determine the sign of I and/or the magnitude of the quadrature term $Q_j$ chosen to determine the sign of Q may approach zero. When the magnitude of the in-phase term $I_k$ chosen to determine the sign of I and/or the magnitude of the quadrature term $Q_j$ chosen to determine the sign of Q approaches zero, the processor component 112 chooses a different quadrature term $Q_j$ and/or in-phase term $I_k$. The processor component 112 chooses a different quadrature term $Q_j$ and/or in-phase term $I_k$ to promote the calculation of the phase angle $\phi$ independent from the demodulation phase offset $\beta$. The phase modulator 106 in one example maintains the demodulation phase offset $\beta$ within a range significantly smaller than $\pi/2$, therefore the demodulation phase offset $\beta$ does not need to be known, as will be appreciated by those skilled in the art.

The processor component 112 employs the quadrature term Q and the in-phase term I to calculate the phase angle $\phi$ independently of the demodulation phase offset $\beta$. Since the quadrature term Q and the in-phase term I are independent from the demodulation phase offset $\beta$, the calculation of the phase angle $\phi$ is independent from the demodulation phase offset $\beta$. The processor component 112 in one example calculates the phase angle:

$$\phi = \text{arctangent}(Q/I).$$

The processor component 112 in one example employs the change in the phase angle $\phi$ between multiple instances of the interference pulses 130, 132, and 134 to determine the change in the parameters employed by the sensors 124, 126, and 128.

Figure 2:
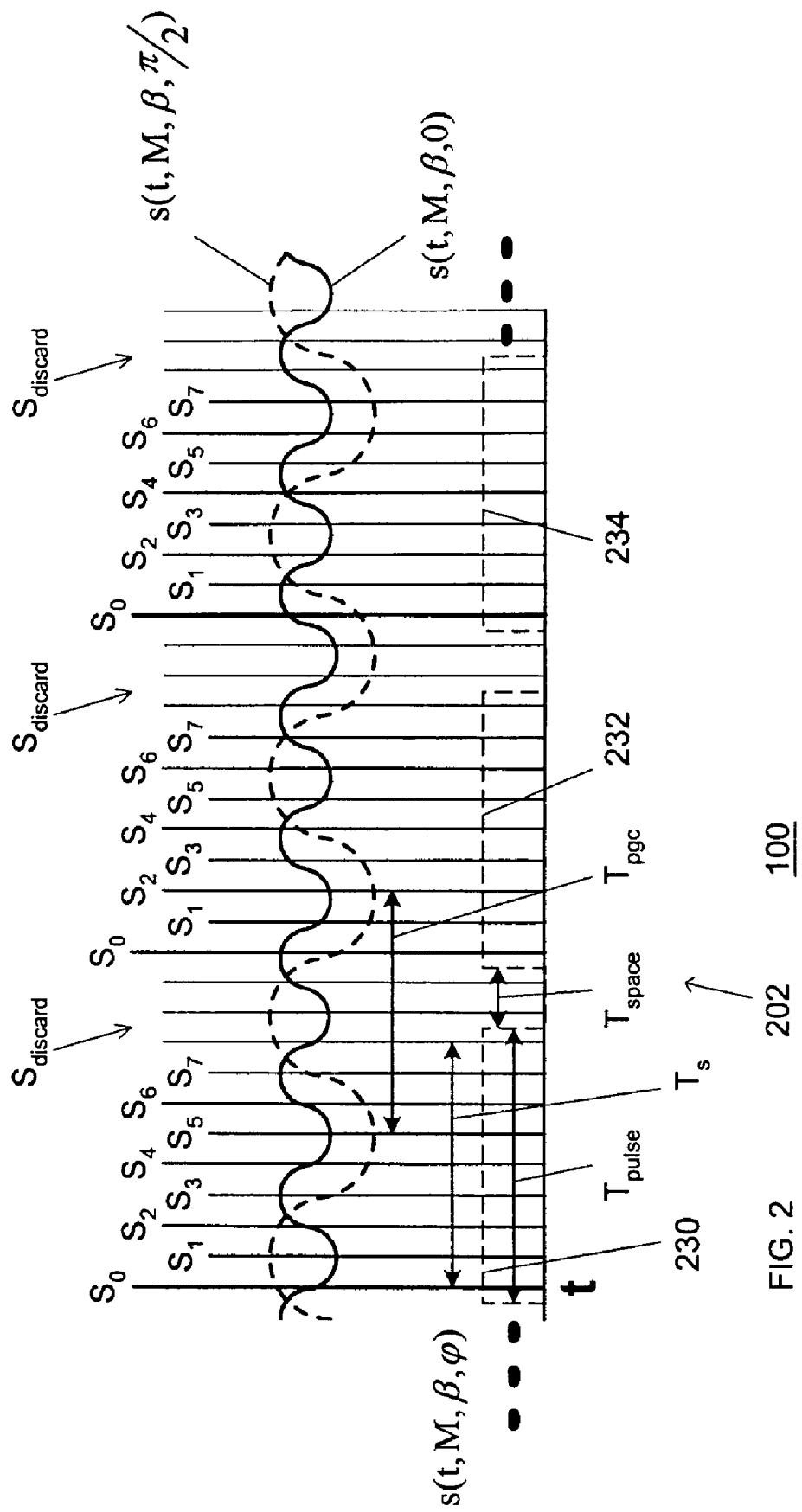
FIG. 2 is a representation of an exemplary plot of one or more interference pulses for the exemplary implementation of FIG. 1.

Turning to FIG. 2, the plot 202 comprises an exemplary representation of the interference pulses 130, 132, and 134 and appropriate sampling times for the processor component 112 with respect to time t. The interference pulses 130, 132, and 134 are represented by the analog electrical signal s(t, M, $\beta$, $\phi$). The quadrature and in-phase components of the interference pulses are represented by s(t, M, $\beta$, $\pi/2$) and s(t, M, $\beta$, 0), respectively. One or more square pulses 230, 232, and 234 represent the period $T_{pulse}$ of the interference pulses 130, 132, and 134, respectively. The square pulses 230, 232, and 234 comprise a spacing period of $T_{space}$. The square pulses 230, 232, and 234 in one example comprise a high duty cycle, for example, the sampling period $T_s$ is substantially longer than the spacing period $T_{space}$.

The processor component 112 in one example obtains eight samples from the respective interference pulses 130, 132, and 134. The processor component 112 in one example obtains the samples at a constant rate over the period $T_s$. For example, the processor component 112 obtains eight samples, $S_0$ through $S_7$, for the interference pulse 130, discards the next three samples $S_{discard}$, obtains the next eight samples, $S_0$ through $S_7$, for the interference pulse 132, discards the next three samples $S_{discard}$, and so forth.

Turning to FIG. 3, a plot 302 comprises a representation of a set of calculations for the quadrature terms $Q_j$ and the in-phase terms $I_k$ for eight samples of the interference pulse 130. Where eight samples are taken, x=7, y=3 and z=1. The processor component 112 calculates a given term by adding and subtracting a plurality of the samples $S_n$ in a respective row of the given term. The processor component 112 adds or subtracts a sample according to a sign designated in the row/column pair for the given term and the sample. If a sign is not listed for a sample, the sample is not used for the given term. For example, the processor component 112 calculates $Q_0$ as $+S_0-S_4$, $Q_2$ as $+S_2-S_6$, and $I_0$ as $+S_0-S_2+S_4-S_6$.

Turning to FIG. 4, a plot 402 comprises a representation of a set of calculations for the quadrature terms $Q_j$ and the in-phase terms $I_k$ for sixteen samples of the interference pulse 130. Where sixteen samples are taken, x=15, y=7, and z=3. For example, the processor component 112 calculates $Q_0$ as $+S_0-S_8$, $Q_1$ as $+S_2-S_9$, and $I_0$ as $+S_0-S_4+S_8-S_{12}$. Turning to FIGS. 3 and 4, patterns of the + and the − signs in one example can be seen for the quadrature terms $Q_j$ and the in-phase terms $I_k$, respectively. For example, similar patterns can be used to calculate a set of quadrature terms $Q_j$ and $I_k$ for a plurality of samples with a different number of samples.

Turning to FIGS. 5–14, plots 502, 602, 702, 802, 902, 1002, 1102, 1202, 1302, and 1402 represent exemplary characteristics of the filter component 111, where the filter component 111 comprises a fourth order Bessel low-pass filter, and exemplary accuracy plots of the calculation of the phase angle φ by the apparatus of FIG. 1. The plots 502, 602, 702, 802, 902, 1002, 1102, 1202, 1302, and 1402 were generated using MathCAD (Mathsoft Engineering & Education, Inc., Cambridge, Mass. 02142, http://www.mathcad-.com). Plot 502 represents an amplitude response $S_b(f)$ of an exemplary fourth order Bessel low-pass filter. Plot 602 represents an impulse response b(t) of the exemplary filter component 111 of FIG. 4. Plot 702 represents an exemplary input signal env(t) to and the respective output signal ENV(t) from the filter component 111 of FIG. 4. Plot 802 represents an enlarged view of the output signal ENV(t) of plot 702. Plot 902 represents an exemplary filtered signal S(t) of an exemplary phase generated carrier 114 with the output signal ENV(t) of plot 702. Plot 1002 represents an exemplary ratio $R_s$ as a function of the demodulation phase offset β. Plot 1102 represents the ratio $R_s$ of plot 1002 as a function of the modulation depth M. Plot 1202 represents a peak value of an exemplary quadrature term $Q_0$ and a peak value of an exemplary in-phase term $I_1$ as a function of the demodulation phase offset β. Plot 1302 represents an exemplary accuracy Δφ of the calculation of the phase angle φ as a function of the demodulation phase offset β. Plot 1402 represents an exemplary accuracy Δφ of the calculation of the phase angle φ as a function of the phase angle φ.

Figure 5:
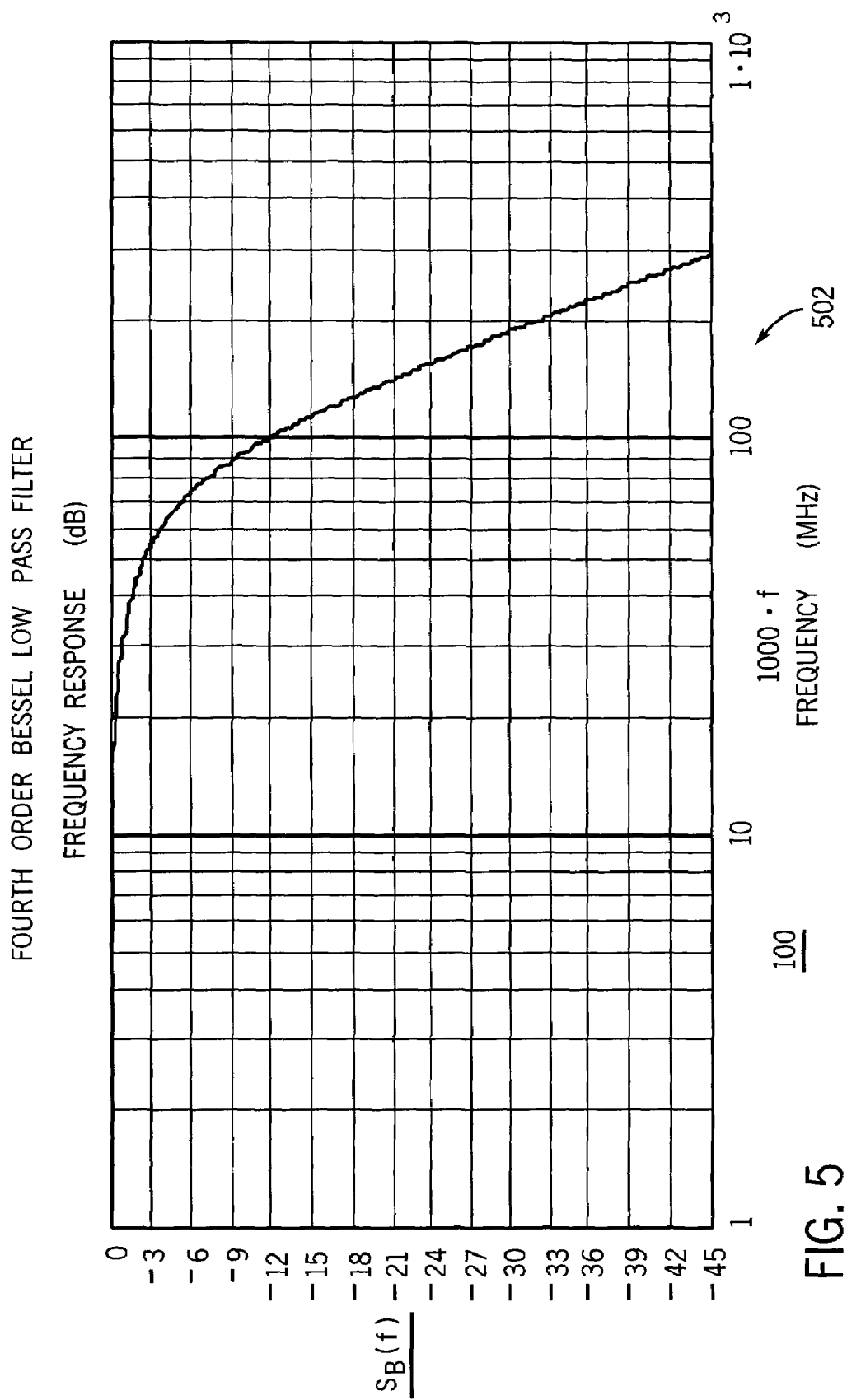
FIG. 5 is a representation of an amplitude response of a fourth order Bessel low-pass filter as an exemplary filter component of the apparatus of FIG. 1

Referring to FIG. 5, plot 502 comprises an exemplary amplitude response $S_B(f)$ for the filter component 111. A complex frequency response B(f) of the filter component 111, where the filter component 111 comprises a fourth order Bessel low-pass filter, is equal to:

$$B(f) = \frac{105}{\left[\left(\frac{f}{f_0}\right)^4 - 45 \cdot \left(\frac{f}{f_0}\right)^2 + 105\right] + li \cdot \left[105 \cdot \left(\frac{f}{f_0}\right) - 10 \cdot \left(\frac{f}{f_0}\right)^3\right]}.$$

The three decibel roll-off of the filter component 111 is equal to $2.114 f_0$.

Figure 6:
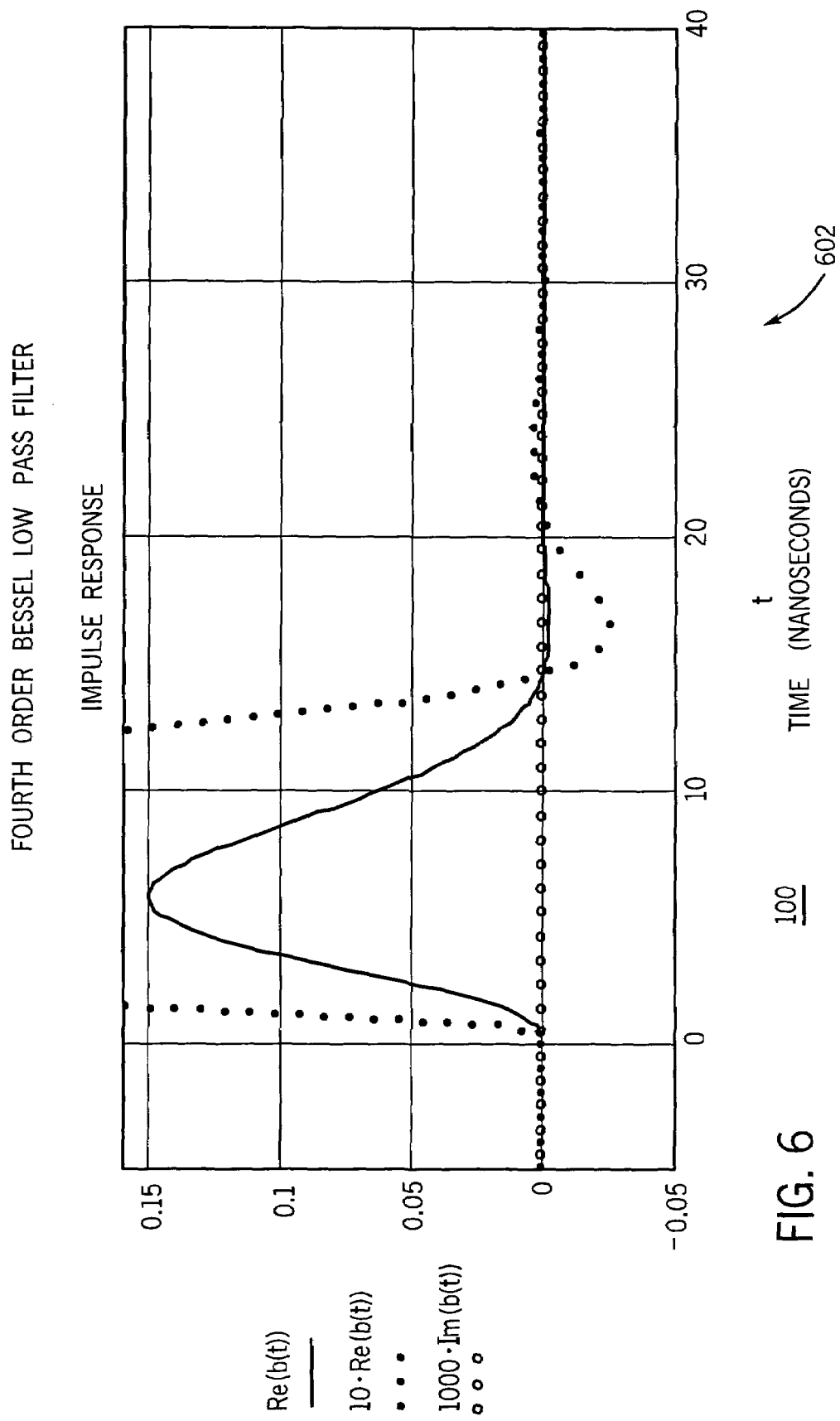
FIG. 6 is a representation of an impulse response of the exemplary implementation of FIG. 1 with the exemplary filter component of FIG. 5.

Referring to FIG. 6, plot 602 comprises an impulse response b(t) of the filter component 111. The impulse response b(t) is equal to the Fourier transform of the frequency response B(f) of the filter component 111. The impulse response b(t) is equal to:

$$b(t) = \int_{-1E9}^{1E9} B(f) \cdot e^{2\pi \cdot li \cdot t} df.$$

Plot 602 comprises a real part Re(b(t)) and an imaginary part Im(b(t)), multiplied by 1000, of the impulse response b(t). Plot 602 further comprises a multiple of 10 times the real part Re(b(t)) to highlight the ripples on a trailing edge of the real part Re(b(t)). The imaginary part Im(b(t)) is equal to zero, so the impulse function b(t) is real.

Figure 7:
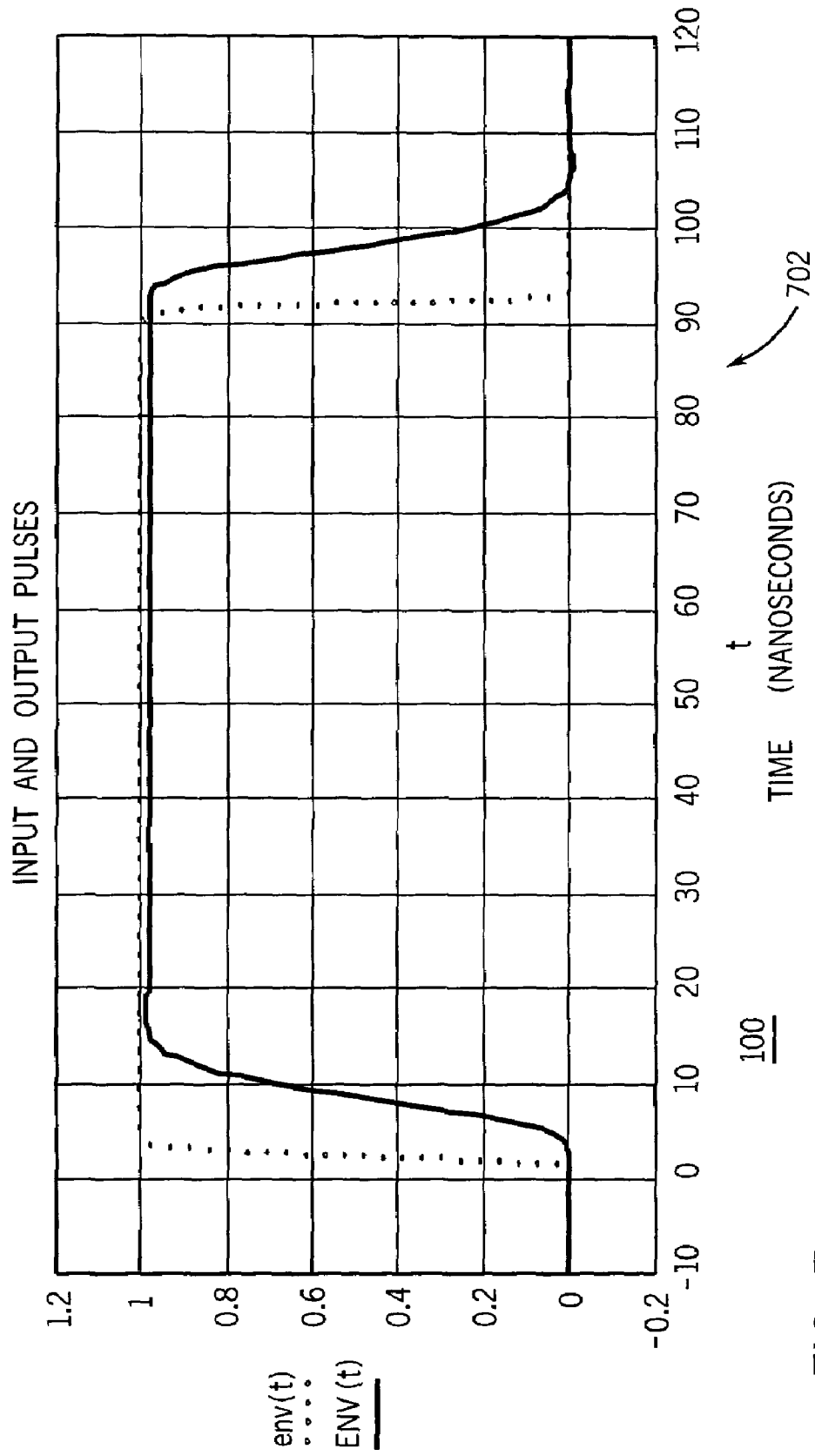
FIG. 7 is a representation of an exemplary input signal to and the respective output signal from the filter component of FIG. 5.

Referring to FIG. 7, plot 702 comprises an exemplary input signal env(t) to the filter component 111. For example, the input signal env(t) represents the electrical signal from the photodetector 110 that represents the output signal 130. The output signal 130 in one example is a flat-top pulse of width 90 nanoseconds with rise and fall times of one nanosecond. The input signal env(t) is approximated by a super-gaussian envelope function as:

$$env(t) = \exp\left(-\left(\frac{t - \tau_0}{T}\right)^{108}\right).$$

The filter component 111 creates the filtered signal that comprises a convolution ENV(t) of the input signal env(t) with the impulse function b(t). An impulse function bfit(t) is used to approximate the impulse function b(t) to speed up the calculation of ENV(t). The convolution ENV(t) is equal to:

$$ENV(t) = \int_0^t bfit(t - v) \cdot env(v) \cdot dv.$$

The convolution ENV(t) comprises ripples at a leading edge and a trailing edge.

Figure 8:
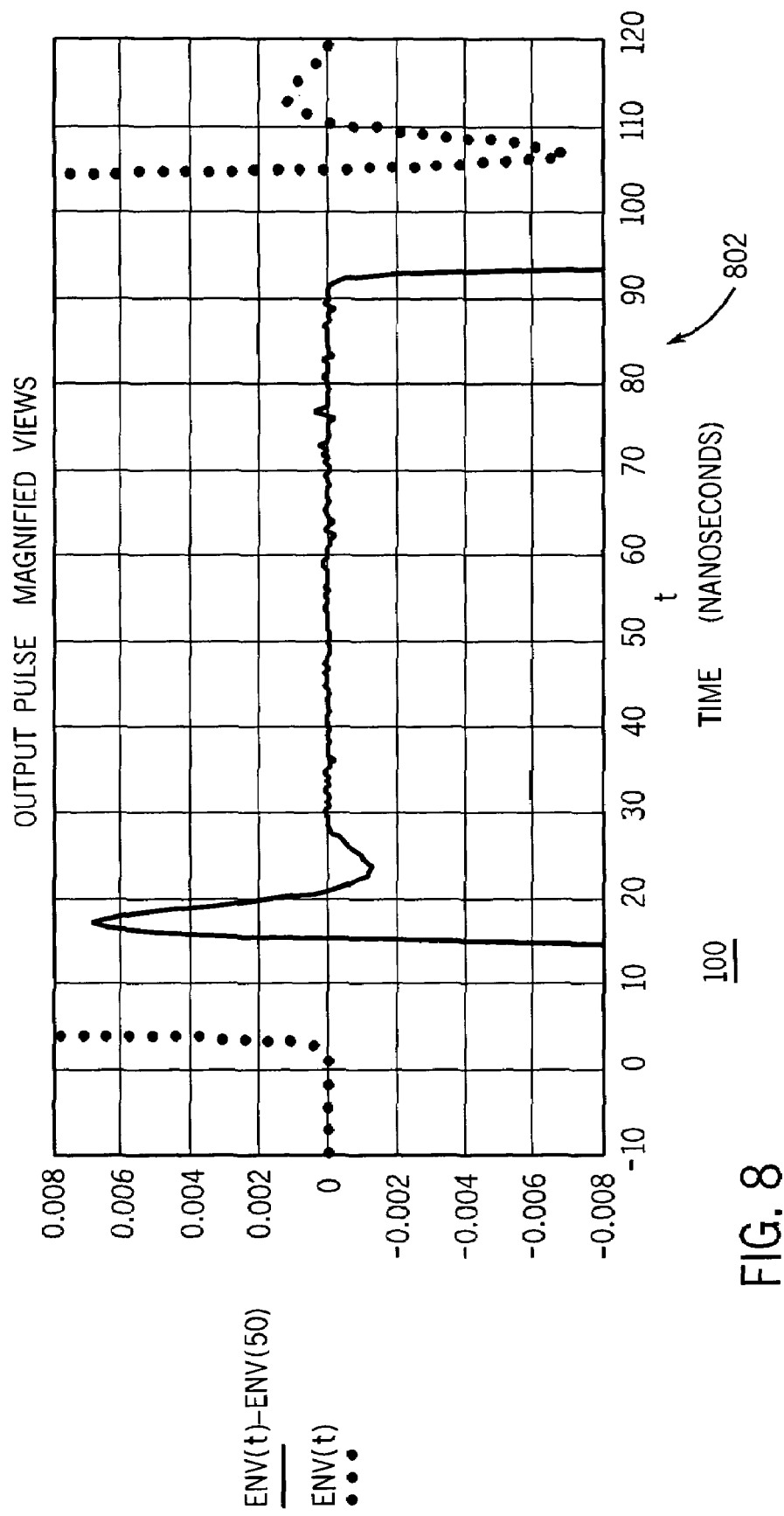
FIG. 8 is an enlarged view of the output signal of FIG. 7.

Referring to FIG. 8, plot 802 comprises highlights of ripples at the leading edge and the trailing edge of the convolution ENV(t) of plot 702. As can be seen, the convolution ENV(t) has a flat zone approximately between 30 nanoseconds to 90 nanoseconds. The processor component 112 takes the plurality of samples $S_n$ from within the flat zone.

Figure 9:
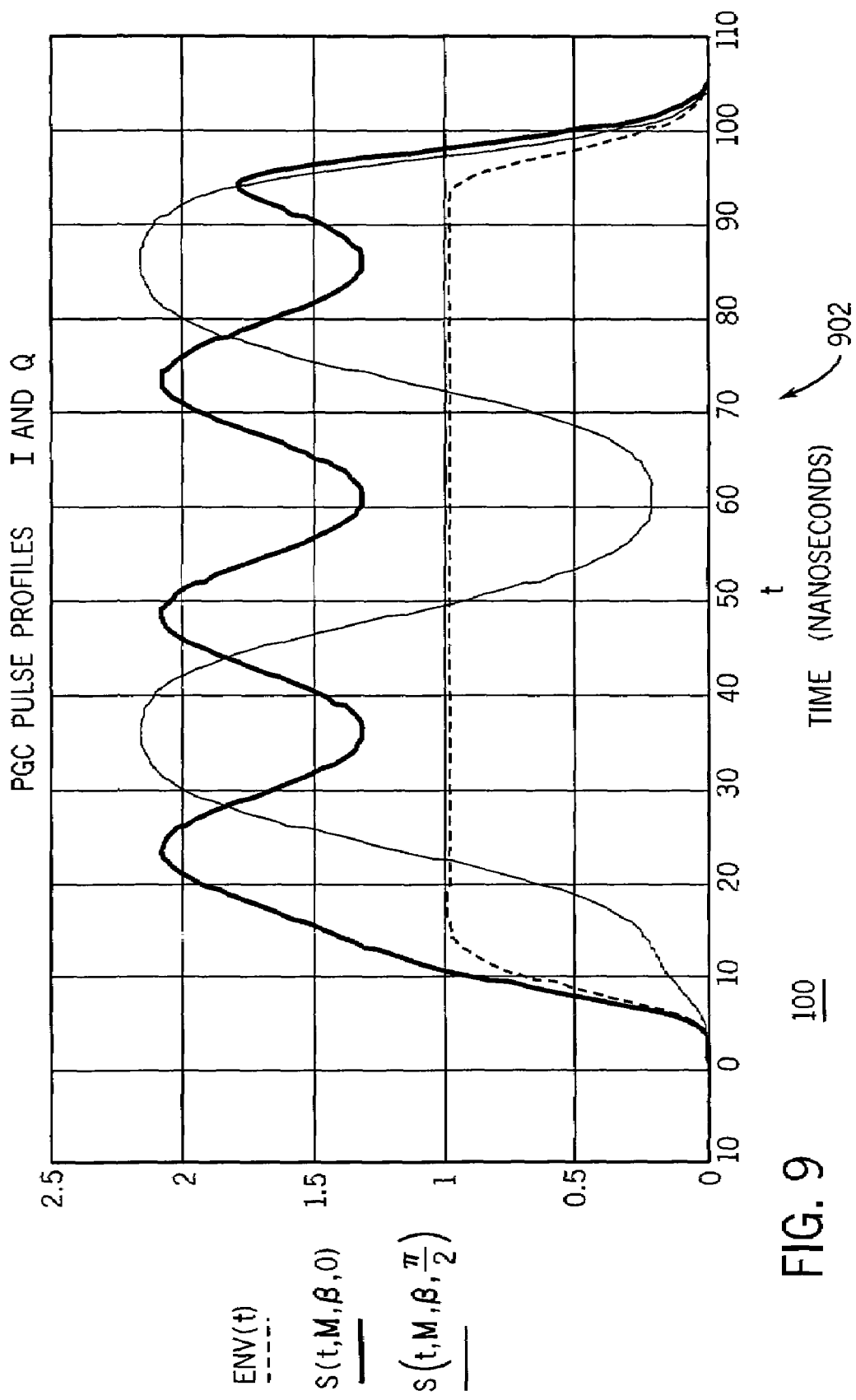
FIG. 9 is an exemplary filtered signal from the filter component of FIG. 5 of an exemplary phase generated carrier and the output signal of FIG. 7.

Referring to FIG. 9, plot 902 comprises a filtered output S(t) of the phase generated carrier 114 with the convolution ENV(t). The phase generated carrier 114 is created by the phase modulator 106 and is represented by s(t, M, β, φ):

$$s(t, M, \beta, \phi) = A + B \cdot \cos\left(\phi + M \cdot \sin\left(\frac{2\pi}{T_{pgc}} \cdot t + \beta\right)\right),$$

where A is an average signal level and B is an interference term signal level. For example, A=1.2, B=1.0, M=1.5. The value of β is arbitrary, but is equal to 1.0 radian in FIG. 9. The phase generated carrier 114 is superimposed on the input signal env(t). The filtered output S(t) is equal to the convolution of the product of the input signal env(t) and s(t) with the impulse function bfit(t):

$$S(t, M, \beta, \phi) = \int_0^t bfit(t - v) \cdot env(v) \cdot s(v, M, \beta, \phi) \cdot dv.$$

Two values of φ are used to show quadrature and in-phase components of the filtered output S(t, M, β, φ). For example, φ is equal to 0 for the in-phase component, and φ is equal to π/2 for the quadrature component. The in-phase term component has a $2^{nd}$ harmonic frequency of 40 MHz, with a period of 25 nanoseconds. The quadrature component has a fundamental frequency of 20 MHz, with a period of 50 nanoseconds. The processor component 112 obtains the plurality of samples $S_n$ over the period of 50 nanoseconds and within the flat zone of the convolution ENV(t). For example, where x=7, the processor component 112 takes eight samples at 6.25 nanosecond intervals. A first sample and a last sample of the eight samples are 43.75 nanoseconds apart. The processor component 112 takes the first sample between 29 nanoseconds and 45 nanoseconds to obtain the plurality of samples $S_n$ within the flat zone.

Figure 10:
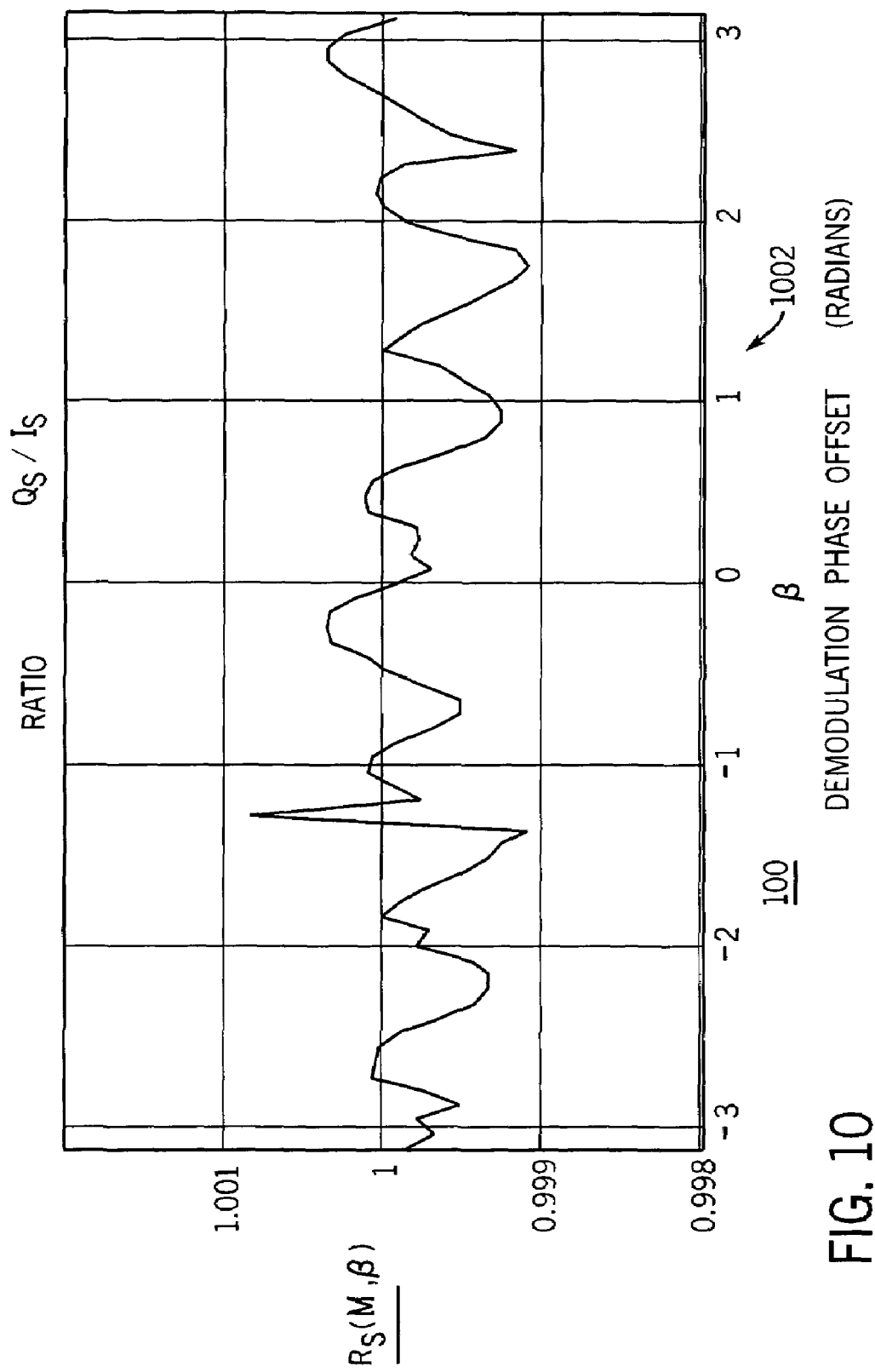
FIG. 10 is an exemplary ratio $R_s$ of the filter component of FIG. 5 as a function of the demodulation phase offset.

Referring to FIG. 10, plot 1002 comprises a ratio $R_s$ as a function of the demodulation phase offset $\beta$ where the modulation depth M=1.5. The ratio $R_s$ is equal to:

$$R_s(M, \beta) = \frac{Q_s\left(M, \beta, \frac{\pi}{2}\right)}{I_s(M, \beta, 0)}.$$

For a modulation depth M=1.5, the constant $C_1$ is approximately equal to 1.944. The ratio $R_s$ is calculated when $Q_s$ and $I_s$ are at a peak value. The peak value of $Q_s$ is at $\phi=\pi/2$. The peak value of $I_s$ is at $\phi=0$. FIG. 10 shows $R_s$ where M=1.5 and $\beta$ between $-\pi$ and $+\pi$. A variation from a ratio of unity for $R_s$ is approximately ±0.1%.

Figure 11:
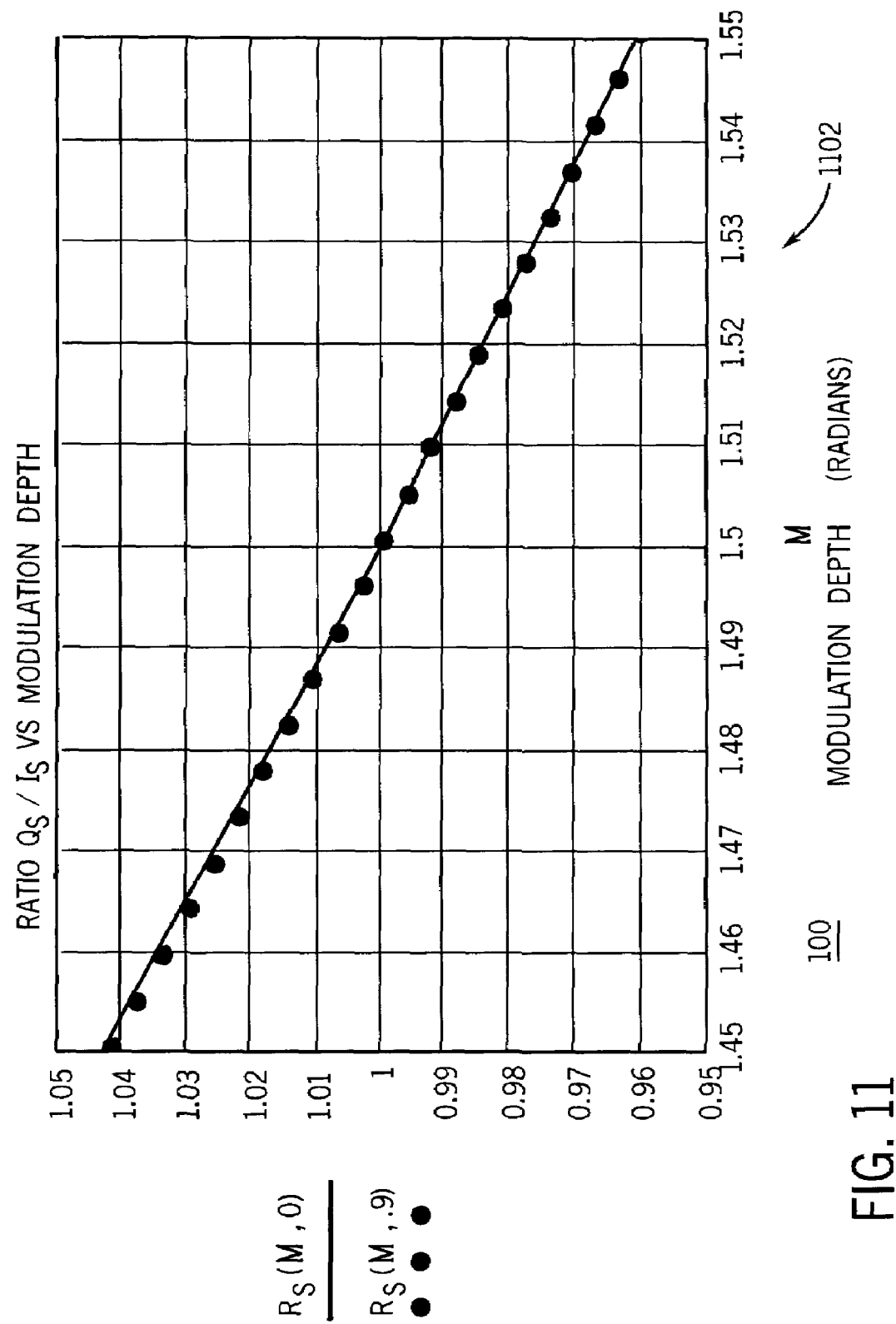
FIG. 11 is an exemplary ratio $R_s$ of the filter component of FIG. 5 as a function of a modulation depth.

Referring to FIG. 11, plot 1102 comprises the ratio $R_s$ as a function of the modulation depth M for two values of the demodulation phase offset $\beta$. FIG. 11 shows that changes in $\beta$ for a given value of M do not significantly change the ratio $R_s$.

Figure 12:
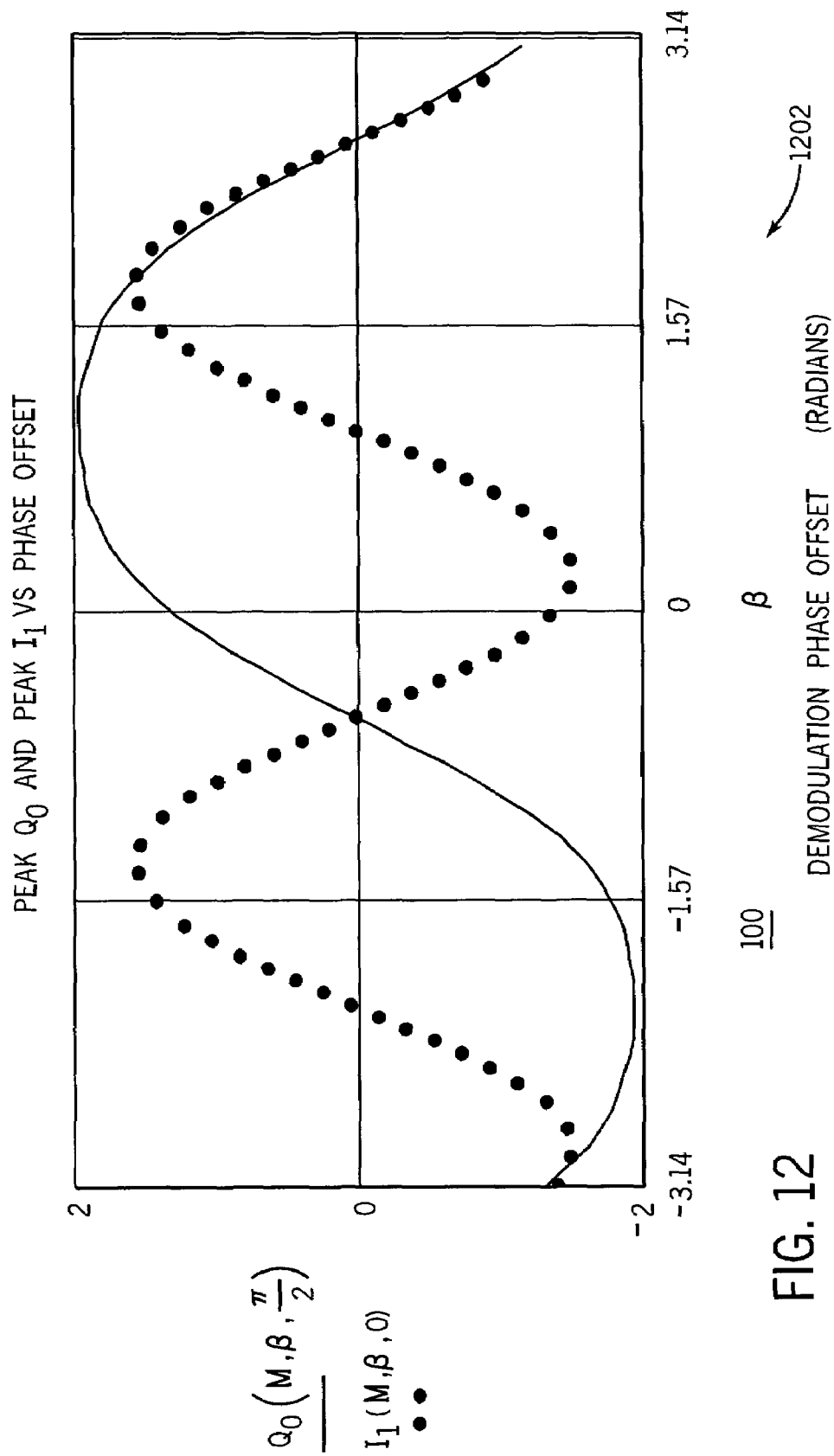
FIG. 12 is a plot of a peak value of an exemplary quadrature term and a peak value of an exemplary in-phase term from the filter component of FIG. 5 as a function of the demodulation phase offset.

Referring to FIG. 12, plot 1202 comprises a peak value of the quadrature term $Q_0$ and a peak value of the in-phase term $I_1$ as a function of the demodulation phase offset $\beta$. The processor component 112 calculates the sign of the quadrature term Q by employing one quadrature term of the set of quadrature terms $Q_j$, for example, $Q_0$. The quadrature term $Q_0$ is proportional to the sine of the phase angle $\phi$. The processor component 112 calculates the sign of the in-phase term I by employing one in-phase term of the set of in-phase terms $I_s$, for example, $I_1$. The in-phase term $I_1$ is proportional to the cosine of the phase angle $\phi$. A peak value for $Q_0$ where $\phi=\pi/2$ and a peak value for $I_1$ where $\phi=0$ are plotted as a function of phase offset $\beta$ in FIG. 12. Four zones in $\beta$ of width $\pi/2$ where the sign of $Q_0$ and the sign of $I_1$ do not change are designated where $I_1$ crosses 0. The processor component 112 calculates the sign of Q and the sign of I based on the value of $\beta$ for $Q_0$ and $I_1$. For example, where $\beta$ is between approximately 1.1 and 2.6, both $Q_0$ and $I_1$ are positive, so $Q=+Q_s$ and $I=+I_s$.

Figure 13:
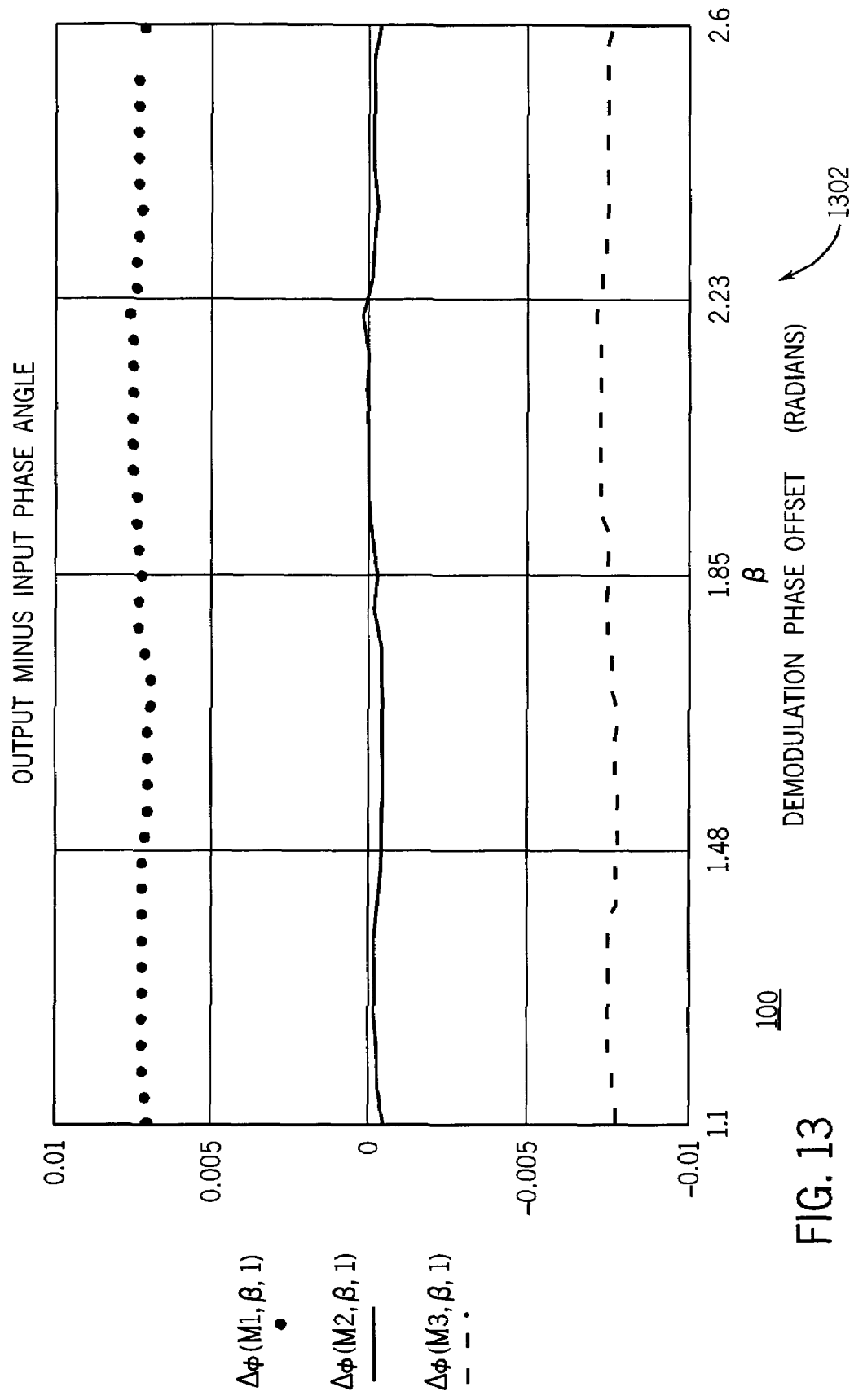
FIG. 13 is a plot of an exemplary accuracy $\Delta\phi$ of the calculation of the phase angle by the apparatus of FIG. 1 with the filter component of FIG. 5 as a function of the demodulation phase offset.

Referring to FIG. 13, plot 1302 comprises an error $\Delta\phi(M, \beta, \phi)$ of the calculation of the phase angle $\phi$ as a function of the demodulation phase offset $\beta$ for various values of the modulation depth M. The error $\Delta\phi(M, \beta, \phi)$ is equal to:

$$\Delta\phi(M, \beta, \phi) = \arctan\left(\frac{Q(M, \beta, \phi)}{I(M, \beta, \phi)}\right) - \phi.$$

Where the measured output phase angle arctan(Q/I) is equal to the input phase angle $\phi$, the error $\Delta\phi$ is equal to 0 and the accuracy of the calculation is maximized. FIG. 13 shows plots of $\Delta\phi(M, \beta, \phi)$ for M=1.48, M=1.50, and M=1.52, where $\phi=1$. The accuracy $\Delta\phi$ is within ±1 milliradian for $\beta$ between 1.1 and 2.6 radians where M=1.50. Where M=1.48, the accuracy $\Delta\phi$ is approximately 7 milliradians. Where M deviates from 1.50 by 20 milliradians, for example, M=1.52 or M=1.48, the accuracy $\Delta\phi$ is approximately 7 milliradians.

Figure 14:
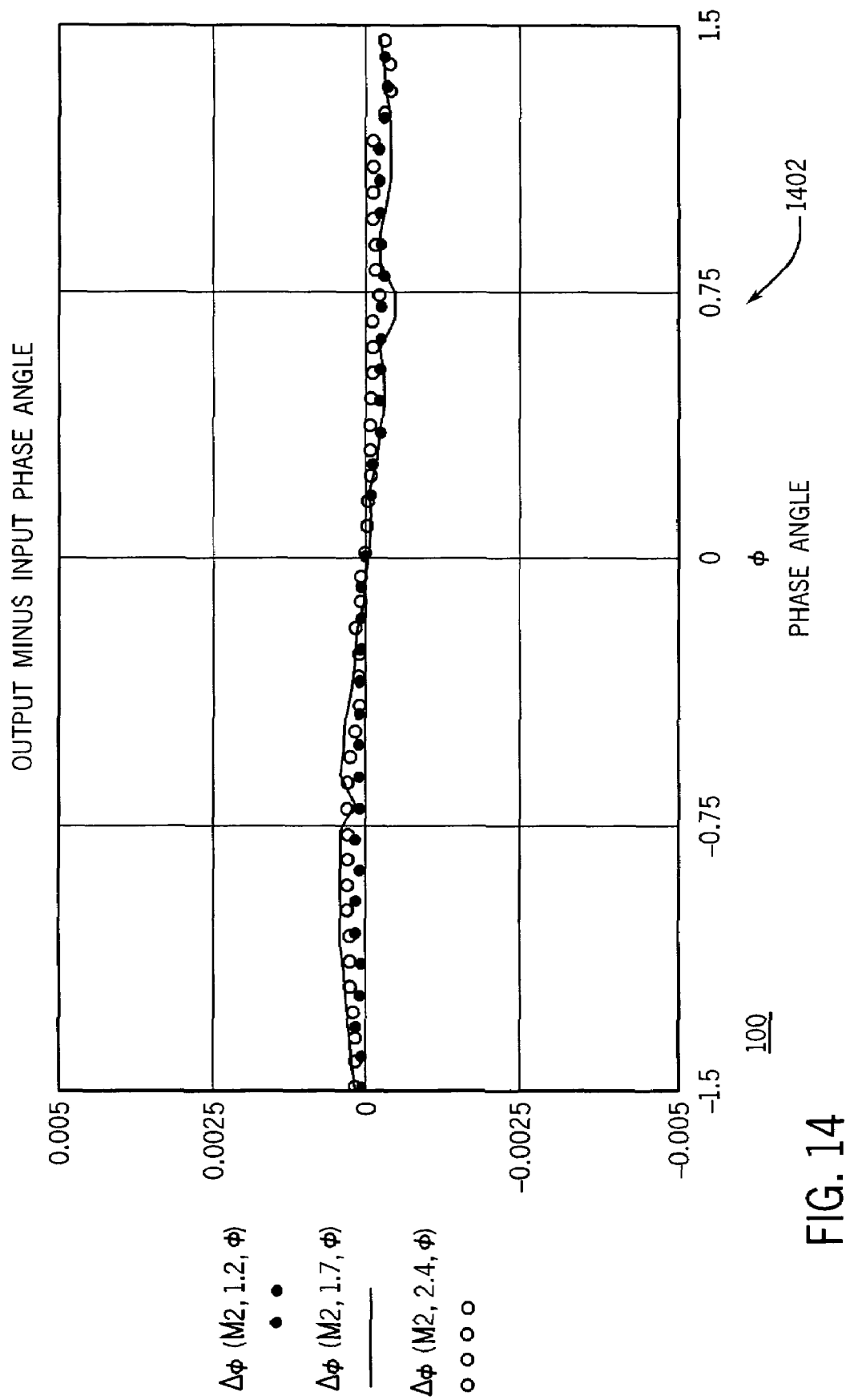
FIG. 14 is a plot of an exemplary accuracy $\Delta\phi$ of the calculation of the phase angle by the apparatus of FIG. 1 with the filter component of FIG. 5 as a function of a phase angle $\phi$.

Referring to FIG. 14, plot 1402 comprises the error $\Delta\phi(M, \beta, \phi)$ as a function of phase angle $\phi$ where the modulation depth M=1.5 and three values of the demodulation phase offset $\beta$ are within the zone from 1.1 to 2.6. Where $\beta=1.2$, 1.7, and 2.4, the accuracy $\Delta\phi(M, \beta, \phi)$ is within ±1.0 milliradian. Referring to FIGS. 13 and 14, variations in the demodulation phase offset $\beta$ do not significantly affect the accuracy $\Delta\phi(M, \beta, \phi)$ of the calculation of the phase angle $\phi$.

The apparatus 100 in one example employs one or more computer-readable signal-bearing media. One example of a computer-readable signal-bearing media for the apparatus 100 comprises the recordable data storage media 144 of the processor component 112. For example, the computer-readable signal-bearing media for the apparatus 100 comprises one or more of a magnetic, electrical, optical, biological, and atomic data storage media. In one example, the computer-readable signal-bearing media comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, a sensor array that employs a parameter to induce a time-varying phase angle $\phi$ on an optical signal that comprises a phase generated carrier with a demodulation phase offset $\beta$, the method comprising the steps of:

filtering an output signal from the sensor array to create a filtered signal; and calculating the phase angle $\phi$ substantially independently of the demodulation phase offset $\beta$ through employment of the filtered signal.

2. The method of claim 1, further comprising the step of:

sampling an output signal from the sensor array to obtain a plurality of samples $S_n$, wherein n=0 to x;

wherein the step of calculating the phase angle $\phi$ substantially independently of the demodulation phase offset $\beta$ through employment of the filtered signal comprises the step of:

calculating the phase angle $\phi$ substantially independently of the demodulation phase offset $\beta$ through employment of one or more of the plurality of samples $S_n$.

3. The method of claim 2, wherein the step of calculating the phase angle $\phi$ substantially independently of the demodulation phase offset $\beta$ through employment of the one or more of the plurality of samples $S_n$ comprises the steps of:

calculating one or more quadrature terms and one or more in-phase terms through employment of one or more of the plurality of samples $S_n$, wherein one or more of the one or more quadrature terms and one or more of the one or more in-phase terms are substantially independent from the demodulation phase offset $\beta$; and calculating the phase angle $\phi$ through employment of the one or more quadrature terms and the one or more in-phase terms.

4. The method of claim 2, wherein the output signal comprises a period $T_{pulse}$, wherein the step of sampling the output signal from the sensor array to obtain the plurality of samples $S_n$, wherein n=0 to x comprises the step of:

sampling the output signal from the sensor array to obtain a plurality of samples $S_n$ within a period $T_s$, wherein n=0 to x, wherein $T_s$ is less than or equal to $T_{pulse}$.

5. The method of claim 4, wherein the step of calculating the phase angle $\phi$ substantially independently of the demodulation phase offset $\beta$ through employment of the one or more of the plurality of samples $S_n$ comprises the steps of:
   calculating one or more quadrature terms and one or more in-phase terms through employment of one or more of the plurality of samples $S_n$, wherein one or more of the one or more quadrature terms and one or more of the one or more in-phase terms are substantially independent from the demodulation phase offset $\beta$;
   calculating the phase angle $\phi$ through employment of the one or more quadrature terms and the one or more in-phase terms.

6. The method of claim 5, wherein the step of calculating the one or more quadrature terms and the one or more in-phase terms through employment of the one or more of the plurality of samples $S_n$, wherein the one or more of the one or more quadrature terms and the one or more of the one or more in-phase terms are substantially independent of the demodulation phase offset $\beta$ comprises the steps of:
   calculating a set of quadrature terms $Q_j$ and a set of in-phase terms $I_k$ through employment of one or more of the plurality of samples $S_n$, wherein j=0 to y, wherein k=0 to z;
   calculating a quadrature term $$Q_s = \sqrt{\sum_{j=0}^{j=y} Q_j^2},$$

wherein $Q_s$ is substantially independent of the demodulation phase offset $\beta$;
   calculating an in-phase term $$I_s = C_1 \times \sqrt{\sum_{k=0}^{k=z} I_k^2},$$

wherein $I_s$ is substantially independent of the demodulation phase offset $\beta$; and
   calculating the constant $C_1$ such that a maximum magnitude of the quadrature term $Q_s$ and a maximum magnitude of the in-phase term $I_s$ comprise a substantially same magnitude for a modulation depth M of an operating range for the phase generated carrier.

7. The method of claim 6, wherein x=7, y=3, z=1, wherein the step of calculating the set of quadrature terms $Q_j$ and the set of in-phase terms $I_k$ through employment of the one or more of the plurality of samples $S_n$, wherein j=0 to y, wherein k=0 to z comprises the steps of:

calculating $Q_0 = S_0 - S_4$;

calculating $Q_1 = S_1 - S_5$;

calculating $Q_2 = S_2 - S_6$;

calculating $Q_3 = S_3 - S_7$;

calculating $I_0 = (S_0 + S_4) - (S_2 + S_6)$; and calculating $I_1 = (S_1 + S_5) - (S_3 + S_7)$.

8. The method of claim 6, wherein x=15, y=7, z=3, wherein the step of calculating the set of quadrature terms $Q_j$ and the set of in-phase terms $I_k$ through employment of the one or more of the plurality of samples $S_n$, wherein j=0 to y, wherein k=0 to z comprises the steps of:

calculating $Q_0 = S_0 - S_8$;

calculating $Q_1 = S_1 - S_9$;

calculating $Q_2 = S_2 - S_{10}$;

calculating $Q_3 = S_3 - S_{11}$;

calculating $Q_4 = S_4 - S_{12}$;

calculating $Q_5 = S_5 - S_{13}$;

calculating $Q_6 = S_6 - S_{14}$;

calculating $Q_7 = S_7 - S_{15}$;

calculating $I_0 = (S_0 + S_8) - (S_4 + S_{12})$;

calculating $I_1 = (S_1 + S_9) - (S_5 + S_{13})$;

calculating $I_2 = (S_2 + S_{10}) - (S_6 + S_{14})$; and calculating $I_3 = (S_3 + S_{11}) - (S_7 + S_{15})$.

9. The method of claim 6, wherein the step of calculating the phase angle $\phi$ through employment of the one or more quadrature terms and the one or more in-phase terms comprises the steps of:
   calculating a quadrature term Q from a magnitude of the quadrature term $Q_s$ and one or more quadrature terms of the set of quadrature terms $Q_j$;
   calculating an in-phase term I from a magnitude of the in-phase term $I_s$ and one or more in-phase terms of the set of in-phase terms $I_k$; and
   calculating the phase angle $\phi$ of the output signal from an arctangent of a quantity Q/I.

10. An apparatus, a sensor array that employs a parameter to induce a time-varying phase angle $\phi$ on an optical signal that comprises a phase generated carrier with a demodulation phase offset $\beta$, the apparatus comprising:
    a filter component that filters an output signal from the sensor array to create a filtered signal; and
    a processor component that employs the filtered signal to calculate the phase angle $\phi$ substantially independent from the demodulation phase offset $\beta$.

11. The apparatus of claim 10, wherein the processor component obtains a plurality of samples $S_n$ of the filtered signal, wherein n=0 to x;
    wherein the processor component employs one or more of the plurality of samples $S_n$ to calculate the phase angle $\phi$ substantially independent from the demodulation phase offset $\beta$.

12. The apparatus of claim 11, wherein the processor component employs one or more of the plurality of samples $S_n$ of the output signal to calculate one or more quadrature terms and one or more in-phase terms, wherein one or more of the one or more quadrature terms and one or more of the one or more in-phase terms are substantially independent from the demodulation phase offset $\beta$ of the phase generated carrier;
    wherein the processor component employs the one or more quadrature terms and the one or more in-phase terms to calculate the phase angle $\phi$.

13. The apparatus of claim 11, wherein the output signal comprises a period $T_{pulse}$, wherein the processor component obtains the plurality of samples $S_n$ within a period $T_s$, wherein $T_s$ is less than or equal to $T_{pulse}$.

14. The apparatus of claim 13, wherein the processor component employs one or more of the plurality of samples $S_n$ of the output signal to calculate one or more quadrature terms and one or more in-phase terms, wherein one or more of the one or more quadrature terms and one or more of the one or more in-phase terms are substantially independent from the demodulation phase offset β of the phase generated carrier;
wherein the processor component employs the one or more quadrature terms and the one or more in-phase terms to calculate the phase angle φ.

15. The apparatus of claim 14, wherein the one or more of the one or more quadrature terms comprise a quadrature term $Q_s$, wherein the one or more of the one or more in-phase terms comprise an in-phase term $I_s$;
wherein the processor component employs one or more of the plurality of samples $S_n$, the quadrature term $Q_s$, and the in-phase term $I_s$ to calculate the phase angle φ.

16. The apparatus of claim 15, wherein the processor component employs the plurality of samples $S_n$ to calculate a set of quadrature terms $Q_j$ and a set of in-phase terms $I_k$, wherein j=0 to y, wherein k=0 to z;
wherein the processor component employs the set of quadrature terms $Q_j$ and the set of in-phase terms $I_k$ to calculate the quadrature term $Q_s$, and the in-phase term $I_s$.

17. The apparatus of claim 16, wherein the processor component calculates a constant $C_1$, wherein the processor component calculates:

$$Q_s = \sqrt{\sum_{j=0}^{j=y} Q_j^2}\,;$$

wherein the processor component calculates:

$$I_s = C_1 \times \sqrt{\sum_{k=0}^{k=z} I_k^2}\,;$$

wherein the processor component calculates the constant $C_1$ such that a magnitude of the quadrature term $Q_s$ and a magnitude of the in-phase term $I_s$ comprise a substantially same magnitude at a modulation depth M of an operating range for the phase generated carrier.

18. The apparatus of claim 17, wherein the processor component employs the quadrature term $Q_s$ and the set of quadrature terms $Q_j$ to calculate a quadrature term Q, wherein the processor component employs the in-phase term $I_s$ and the set of in-phase terms $I_k$ to calculate an in-phase term I;
wherein the processor component calculates:

$Q = \pm Q_s$;

wherein the processor component calculates:

$I = \pm I_s$;

wherein the processor component employs the set of quadrature terms $Q_j$ to determine a sign of Q;
wherein the processor component employs the set of in-phase terms $I_k$ to determine a sign of I;

wherein the processor component calculates:

φ=arctangent (Q/I).

19. The apparatus of claim 18, wherein x=7, y=3, and z=1; wherein the processor component calculates:

$Q_0 = S_0 - S_4$, $Q_1 = S_1 - S_5$, $Q_2 = S_2 - S_6$, and $Q_3 = S_3 - S_7$;

wherein the processor component calculates:

$I_0 = (S_0 + S_4) - (S_2 + S_6)$; and $I_1 = (S_1 + S_5) - (S_3 + S_7)$.

20. The apparatus of claim 18, wherein x=15, y=7, and z=3;
wherein the processor component calculates:

$Q_0 = S_0 - S_8$, $Q_1 = S_1 - S_9$, $Q_2 = S_2 - S_{10}$, $Q_3 = S_3 - S_{11}$, $Q_4 = S_4 - S_{12}$, $Q_5 = S_5 - S_{13}$, $Q_6 = S_6 - S_{14}$, and $Q_7 = S_7 - S_{15}$;

wherein the processor component calculates:

$I_0 = (S_0 + S_8) - (S_4 + S_{12})$, $I_1 = (S_1 + S_9) - (S_5 + S_{13})$, $I_2 = (S_2 + S_{10}) - (S_6 + S_{14})$, and $I_3 = (S_3 + S_{11}) - (S_7 + S_{15})$.

21. The apparatus of claim 10, wherein the period $T_{pgc}$ of the phase generated carrier comprises a frequency $f_{pgc}$ equal to $1/T_{pgc}$, wherein the frequency $f_{pgc}$ is approximately between 2 MHz and 20 MHz, wherein the phase generated carrier comprises a modulation depth M approximately between 1.0 radians and 1.7 radians, wherein the filter component comprises a 3 dB roll-off frequency approximately between 10 MHz and 60 MHz.

22. The apparatus of claim 21, wherein the filter component comprises a fourth order Bessel low-pass filter.

23. The apparatus of claim 21, wherein the filter component comprises a fourth order real pole filter.

24. An article, a sensor array that employs a parameter to induce a time-varying phase angle φ on an optical signal that comprises a phase generated carrier with a demodulation phase offset β, the article comprising:
one or more computer-readable signal-bearing media;
means in the one or more media for filtering an output signal from the sensor array to create a filtered signal; and
means in the one or more media for calculating the phase angle φ substantially independently of the demodulation phase offset β through employment of the filtered signal.

25. The article of claim 24, further comprising:
means in the one or more media for sampling the filtered signal to obtain a plurality of samples $S_n$, wherein n=0 to x;
wherein the means in the one or more media for calculating the phase angle φ substantially independently of the demodulation phase offset β through employment of the filtered signal comprises:
means in the one or more media for calculating the phase angle φ substantially independently of the demodulation phase offset β through employment of one or more of the plurality of samples $S_n$.

26. The article of claim 25, wherein the means in the one or more media for calculating the phase angle φ substantially independently of the demodulation phase offset β through employment of the one or more of the plurality of samples $S_n$ comprises:
means in the one or more media for calculating one or more quadrature terms and one or more in-phase terms through employment of one or more of the plurality of samples $S_n$, wherein one or more of the one or more quadrature terms and one or more of the one or more in-phase terms are substantially independent from the demodulation phase offset $\beta$; and means in the one or more media for calculating the phase angle $\phi$ through employment of the one or more quadrature terms and the one or more in-phase terms.

27. The article of claim 26, wherein the output signal comprises a period $T_{pulse}$, wherein the means in the one or more media for sampling the output signal from the sensor array to obtain the plurality of samples $S_n$, wherein n=0 to x comprises:

means in the one or more media for sampling the output signal from the sensor array to obtain the plurality of samples $S_n$ within a period $T_s$, wherein n=0 to x, wherein $T_s$ is less than or equal to $T_{pulse}$.

28. The article of claim 27, wherein the means in the one or more media for calculating the phase angle $\phi$ substantially independently of the demodulation phase offset $\beta$ through employment of the one or more of the plurality of samples $S_n$ comprises:

means in the one or more media for calculating one or more quadrature terms and one or more in-phase terms through employment of one or more of the plurality of samples $S_n$, wherein one or more of the one or more quadrature terms and one or more of the one or more in-phase terms are substantially independent from the demodulation phase offset $\beta$; and means in the one or more media for calculating the phase angle $\phi$ through employment of the one or more quadrature terms and the one or more in-phase terms.

29. The article of claim 28, wherein the means in the one or more media for calculating the one or more quadrature terms and the one or more in-phase terms through employment of the one or more of the plurality of samples $S_n$ comprises:

means in the one or more media for calculating a set of quadrature terms $Q_j$ and a set of in-phase terms $I_k$ through employment of one or more of the plurality of samples $S_n$, wherein j=0 to y, wherein k=0 to z;

means in the one or more media for calculating a quadrature term $$Q_s = \sqrt{\sum_{j=0}^{j=y} Q_j^2},$$

wherein $Q_s$ is substantially independent of the demodulation phase offset $\beta$;

means in the one or more media for calculating an in-phase term $$I_s = C_1 \times \sqrt{\sum_{k=0}^{k=z} I_k^2},$$

wherein $I_s$ is substantially independent of the demodulation phase offset $\beta$; and means in the one or more media for calculating the constant $C_1$ such that a maximum magnitude of the quadrature term $Q_s$ and a maximum magnitude of the in-phase term $I_s$ comprise a substantially same magnitude for a modulation depth M of an operating range for the phase generated carrier.

30. The article of claim 29, further comprising:

means in the one or more media for employing the quadrature term $Q_s$ and the set of quadrature terms $Q_j$ to calculate a quadrature term $Q = \pm Q_s$;

means in the one or more media for employing the in-phase term $I_s$ and the set of in-phase terms $I_k$ to calculate an in-phase term $I = \pm I_s$;

means in the one or more media for employing the set of quadrature terms $Q_j$ to determine a sign of Q;

means in the one or more media for employing the set of in-phase terms $I_k$ to determine a sign of I;

means in the one or more media for calculating $\phi$=arctangent (Q/I).

31. The article of claim 30, wherein x=7, y=3, and z=1, the article further comprising:

means in the one or more media for calculating:

$Q_0 = S_0 - S_4$, $Q_1 = S_1 - S_5$, $Q_2 = S_2 - S_6$, and $Q_3 = S_3 - S_7$;

means in the one or more media for calculating:

$I_0 = (S_0 + S_4) - (S_2 + S_6)$, and $I_1 = (S_1 + S_5) - (S_3 + S_7)$.

32. The article of claim 30, wherein x=15, y=7, and z=3, the article further comprising:

means in the one or more media for calculating:

$Q_0 = S_0 - S_8$, $Q_1 = S_1 - S_9$, $Q_2 = S_2 - S_{10}$, $Q_3 = S_3 - S_{11}$, $Q_4 = S_4 - S_{12}$, $Q_5 = S_5 - S_{13}$, $Q_6 = S_6 - S_{14}$, and $Q_7 = S_7 - S_{15}$;

means in the one or more media for calculating:

$I_0 = (S_0 + S_8) - (S_4 + S_{12})$, $I_1 = (S_1 + S_9) - (S_5 + S_{13})$, $I_2 = (S_2 + S_{10}) - (S_6 + S_{14})$, and $I_3 = (S_3 + S_{11}) - (S_7 + S_{15})$.

* * * * *